G. M. WEST.
GANG PLOW.
APPLICATION FILED NOV. 22, 1911.
1,035,286.
Patented Aug. 13, 1912.
3 SHEETS—SHEET 3.
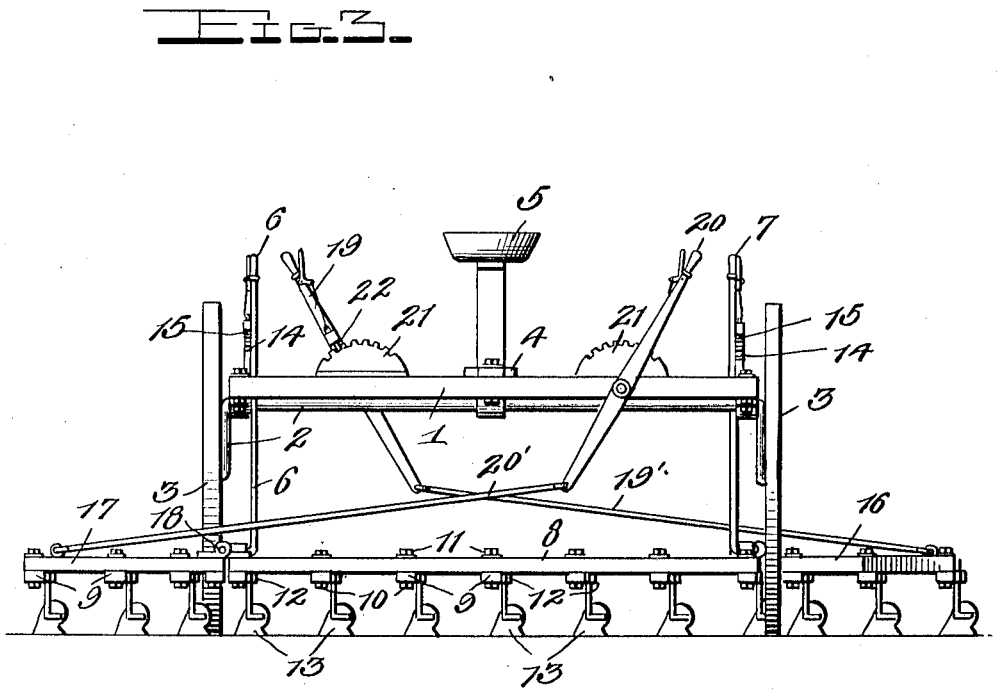
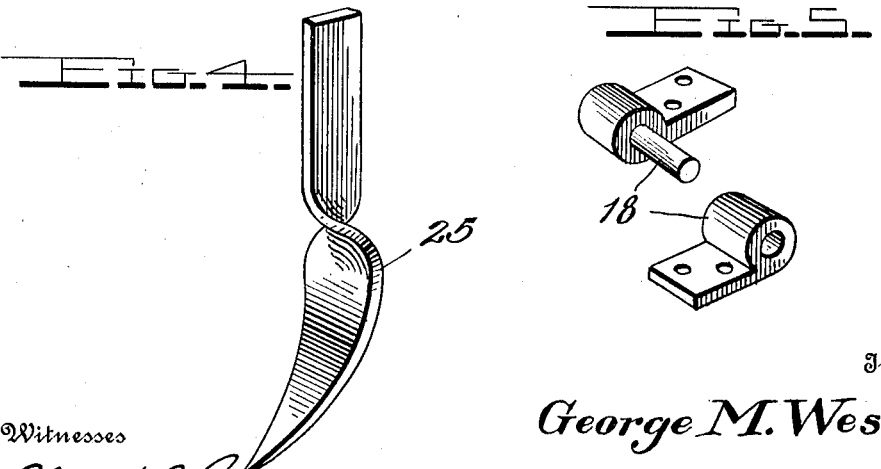
Witnesses
Chas. L. Griesbauer.
L. G. Ellis.
Inventor
George M. West,
By Watson E. Coleman.
Attorney

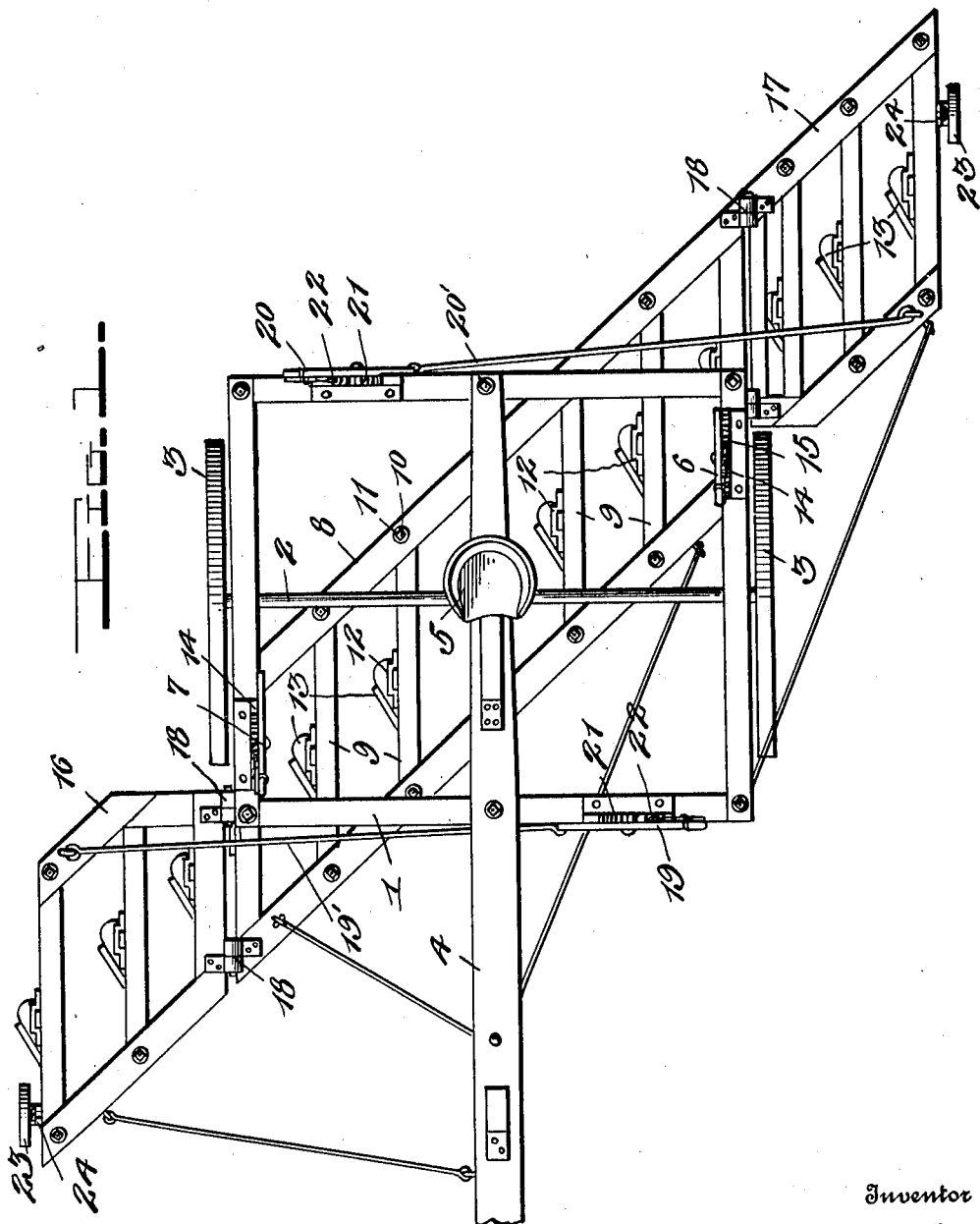

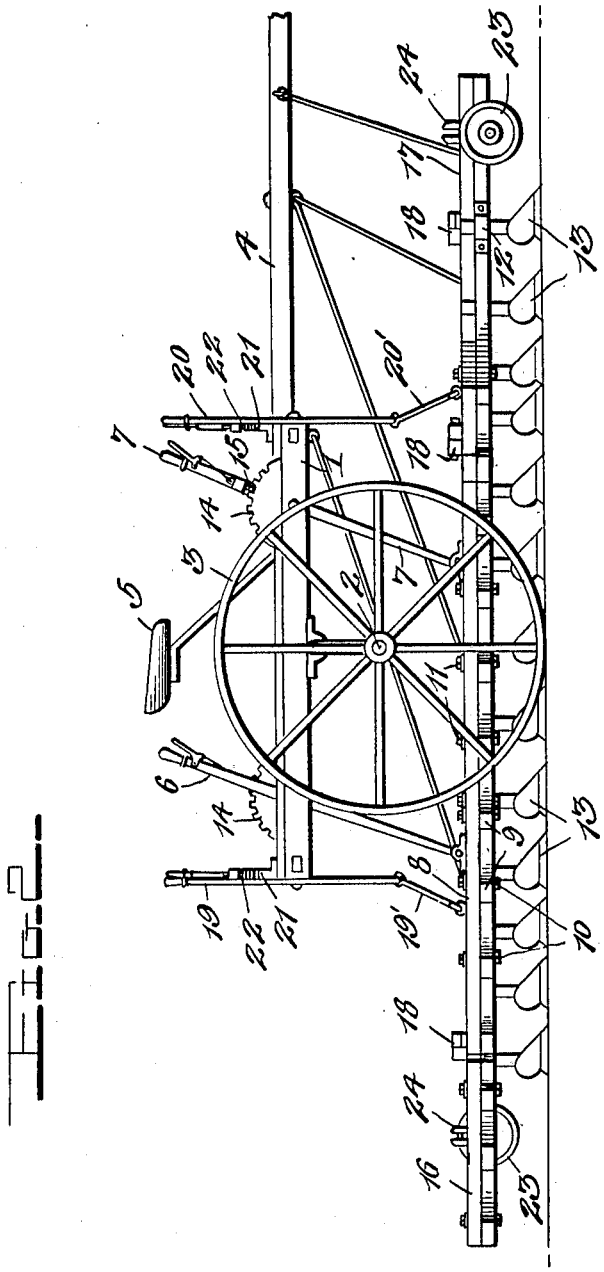

UNITED STATES PATENT OFFICE.

GEORGE MILLER WEST, OF LOS ANGELES, CALIFORNIA.

GANG-PLOW.

1,035,286. Specification of Letters Patent. Patented Aug. 13, 1912.

Application filed November 22, 1911. Serial No. 661,766.

*To all whom it may concern:*

Be it known that I, GEORGE MILLER WEST, a citizen of the United States, residing at Los Angeles, in the county of Los Angeles and State of California, have invented certain new and useful Improvements in Gang-Plows, of which the following is a specification, reference being had to the accompanying drawings.

My invention relates to new and useful improvements in plows and more particularly to a gang plow, having for its object to provide a device of this character which is adjustable and is provided with extension means thereon.

A further object of the invention resides in providing a frame having a plurality of plow beams thereon, which beams are adjustable, and a still further object resides in providing extensions for the frame, which extensions are also provided with plow beams and plows thereon.

A further object of the invention resides in disposing this frame carrying the plow beams at an angle to the main frame of the device, and a still further object resides in providing means for the raising and lowering of the extensions and the raising and lowering of the complete frame.

Still another object resides in providing a device which is simple and durable in construction, and very efficient in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a top plan view of the device. Fig. 2 is a side elevation thereof. Fig. 3 is a rear elevation of the same showing the extensions in their raised positions, Fig. 4 is a side elevation of the cultivating instrument which may be substituted for the plows on the device shown in the foregoing figures, and Fig. 5 is a detail perspective view of the sections of the hinge member used to secure the extensions to the additional frame.

In carrying out my invention, I shall refer to the drawings in which similar reference characters designate corresponding parts throughout the several views and in which—

1 indicates a main frame designed preferably rectangular, as is usual in such agricultural implements, said frame having extending transversely thereacross, the shaft or axle 2, upon the ends of which are rotatably mounted the supporting wheels 3, and extending from the frame 1, is the usual draft tongue 4, while a seat 5 is also mounted on the frame, whereby an operator may be seated thereon and the device driven forwardly. A pair of levers 6 and 7 fulcrumed to the side bars of the frame 1, respectively, adjacent the front and rear bars thereof, have the lower ends thereof pivotally engaged with a frame 8 designed to form a substantial parallelogram, the front and rear bars of which are parallel and disposed on the bias with respect to the frame 1 so as to extend from one corner to the opposite corner thereof. This frame 8 is disposed parallel to the frame 1 and it may be said to have its transverse axis extended at an angle to that of said frame 1, and extending longitudinally of said frame 8 and connecting the front and rear bars thereof, are a plurality of bars or what may be termed plow beams 9. These bars 9 are arranged at regular intervals throughout the length of the frame 9 and are removable thereon, the ends of the same being held to the front and rear bars of the frame by means of the bolts and nuts 10 and 11, respectively. Each of these bars 9 has secured thereto, a keeper 12 through which extends the shank of a plow 13, and from this construction, it will be seen that the device may be driven forwardly to allow the ground to be plowed in rows, and it will also be appreciated that in view of the fact that these bars 9 carrying the plows, are removable or adjustable, any number of the same may be removed to increase the distance between the rows when desired. As this frame 8 is carried on the ends of the levers 6 and 7, it will also be seen that when it is desired to raise said frame so that the plows thereon will be disengaged from the ground as the device is propelled, said levers may be shifted in the required direction to accomplish this result, and further, in order to retain the levers in the adjusted position, the segmental racks 14 are provided adjacent said levers 6 and 7, which racks are adapted to be engaged by the detents or the like 15 carried on the levers. These detents are also adapted to be engaged with the teeth of the racks when the frame is lowered in its effective position so as to cause the same to remain in this position throughout the operation of the device.

The end bars of the frame 8 are disposed in alinement with and below the side bars of the frame 1, so that the ground over which this device is propelled, will not be plowed beyond the supporting wheels thereon, but I have also provided means whereby a greater area of ground can be plowed when desired, and to this extent, I provide the extensions 16 and 17 on the frame 8. These extensions merely continue the parallelogram formed by the frame 8, the same being hinged to the end bars thereof by means of the hinges 18, and each of said extensions is provided with a plurality of longitudinal plow beams or bars carrying plows, as previously mentioned in the description of the frame 8. In order that these extensions 16 and 17 may be raised or lowered when desired, the levers 19 and 20 are provided, which are fulcrumed on the main frame 1 and have their lower ends, respectively, connected with the inner ends of the rods 19' and 20', the outer ends of said rods being pivotally connected to the extensions 16 and 17, respectively, whereby when said levers are moved inwardly toward the longitudinal center of the main frame 1, said extensions will be raised, and when moved in the opposite direction, said extensions will be lowered. In order to retain the levers 19 and 20 in any adjusted position, the segmental racks 21 are provided in connection therewith, the teeth of which are adapted to be engaged by the detents 22 on the levers, and thus, said extensions may be held in their effective or ineffective positions. I have also provided means for the regulation of the depth of ground entered by the plows as the device is propelled, and to this extent, the colters 23 are provided, which colters are carried on the ends of the arms 24 which are, in turn, adjustably mounted on the sides of the extensions 16 and 17. It must here also be stated that while I have particularly described this device as being a gang plow, the plows 13 which are carried on the beams 9, are removably mounted thereon and may be interchanged for any desired ground-treating implement, whatsoever, and in order to show the use of this device as a cultivator, I have shown in Fig. 4 a particular ground-treating implement or shovel 25. Instead of the plows being used, these shovels 25 may be substituted therefor, and the device may be used as a cultivator for a plurality of rows on the field. In this connection, I will also state that the device is capable of various changes in form, proportion and in the minor details of construction without departing from the spirit or sacrificing any of the principles of the invention.

From the foregoing, it will be seen that I have provided an improved gang plow wherein any number of plows may be provided for plowing a field in rows, and it will further be seen that in view of the adjustability of the plow beams, the space between the rows may be regulated, as desired. Furthermore, it will be seen that I have provided means for the plowing of a greater area of ground than is provided by the ordinary plow of this type, which means comprises the extensions described. It will still further be seen that I have provided means for the regulation of these extensions, whereby the same may be readily moved into effective or ineffective position. It will still further be seen that the device complete comprises comparatively few and simple parts, which parts are durable in construction and inexpensive to manufacture, and the device is one which is extremely efficient and useful in operation.

What I claim is:—

1. A plow of the class described comprising a main frame supported on wheels, an additional frame suspended therebelow and extending diagonally of said main frame, the extreme ends of said additional frame being respectively disposed forwardly and rearwardly of the front and rear bars of said main frame, extensions for said additional frame hingedly carried on the ends thereof, plows carried on said additional frame and the extensions thereof, and means at the front and rear ends respectively of said main frame to raise and lower said extensions.

2. A plow of the class described comprising a main frame, supporting wheels therefor, an additional frame movably suspended therebelow and extending diagonally of said main frame, the extreme ends of said additional frame extending respectively beyond the front and rear bars of said main frame, extensions for said additional frame hingedly engaged with the ends thereof, plows removably secured to said additional frame and the extensions of the same, means on the side bars of said main frame at the front and rear ends respectively thereof for raising and lowering said additional frame, and means on the front and rear bars respectively of said main frame for raising and lowering the hinged extensions of said additional frame.

In testimony whereof I hereunto affix my signature in the presence of two witnesses.

GEORGE MILLER WEST.

Witnesses:
 FLORENCE EWING,
 THOMAS P. LYONS.

Copies of this patent may be obtained for five cents each, by addressing the "Commissioner of Patents, Washington, D. C."